United States Patent [19]

Braunheim

[11] Patent Number: 5,591,277
[45] Date of Patent: Jan. 7, 1997

[54] METHOD FOR THERMALLY CONDITIONING DISC DRIVE SWAGE MOUNTS

[75] Inventor: Stephen T. Braunheim, Santa Barbara, Calif.

[73] Assignee: Intri-Plex Technologies, Inc., Santa Barbara, Calif.

[21] Appl. No.: 496,152

[22] Filed: Jun. 28, 1995

[51] Int. Cl.⁶ .................................................. C21D 6/04
[52] U.S. Cl. ...................... 148/578; 148/606; 148/637
[58] Field of Search .................... 148/577, 578, 148/606, 637

[56] References Cited

U.S. PATENT DOCUMENTS

| | | | |
|---|---|---|---|
| 3,819,428 | 6/1974 | Moore | 148/578 |
| 5,288,347 | 2/1994 | Uehara et al. | 148/577 |

FOREIGN PATENT DOCUMENTS

| | | | |
|---|---|---|---|
| 1084318 | 4/1984 | U.S.S.R. | 148/578 |

*Primary Examiner*—Deborah Yee
*Attorney, Agent, or Firm*—Fulwider Patton Lee & Utecht, LLP

[57] ABSTRACT

A method for thermally conditioning a disc drive swage mount to enhance torque retention capability and plate stiffness wherein the swage mount is baked in an oxygen depleted environment to an elevated temperature within a predetermined range of temperatures which activates inherent frictional properties therein and controllably cooled non-linearly through a series of thermal cycles then instantaneously quenched to alter the material grain structure forming the swage mount. After the component is quenched, it is returned to ambient conditions for assembly into such disc drives.

9 Claims, 2 Drawing Sheets

METHOD FOR THERMALLY CONDITIONING DISC DRIVE SWAGE MOUNTS

BACKGROUND OF THE INVENTION

1. Field of the Invention

This invention relates to a method for treating stainless steel disc drive components to increase torque retention and plate stiffness properties.

2. Description of the Prior Art

An important form of data storage and retrieval involves the use of disc drives comprising circular discs coated with a magnetic or reflective medium which are rotated at high speeds proximate highly sensitive sensing mechanisms. These mechanisms, commonly referred to as read/write heads are pivotally connected to mechanical actuators and swept across the surface of the discs to "write" or "read" data therefrom. Connecting the heads to the actuators is a series of fixedly interconnected components which extend across the face of such discs to bring such heads proximate any data retaining area of the rotating disc. Such components include an actuator member having one end pivotally mounted to the actuator with the other end terminated by an "E-beam" which supports a "load beam" laterally extending therefrom and frictionally fastened thereto in a stacked vertical relationship by a component commonly referred to as a swage mount. With disc drive access times decreasing below the ten millisecond threshold, such interconnected components sweep across such discs at rates sufficient to generate acceleration levels up to 40 Gs. Therefore, fabrication methods to make frictional fasteners capable of withstanding such forces are critical to successful operation of these types of data storage systems.

Swage mounts used in conventional disc drive applications are intricately formed stainless steel fasteners designed to secure disc drive load beams to respective actuator members and prevent relative rotational movement therebetween. Having thin rectangular bases with upturned circular hubs, the mounts typically engage a complementally formed aperture in the load beam after being affixed to an E-beam. Upon engaging the load beam aperture, the swage mount hub is slightly deformed outwardly, against the load beam wall defining the aperture, forming a tight frictional bond. The efficiency of such a bond is commonly referred to as "torque retention" and depends not only on the inherent frictional characteristics of the metal but also on the mass of the hub.

Under current practice, torque retention is maximized by increasing the coefficient of friction of the stainless steel using an annealing process which hardens the component to a predetermined durometer magnitude. The process involves exposing the material to a constant elevated temperature in excess of 1800 degrees F., known as the "red area" for stainless steel because of the fiery red hot color apparent therein. Once the component is sufficiently heated, it is subjected to a furnace cool which involves linearly ramping the temperature downwardly until conditions approaching ambient are achieved. A serious disadvantage to treating swage mounts using this process is that the maximum achievable frictional properties of the treated swage mount material sets a lower limit on hub heights, thus preventing further miniaturization of the components using currently established assembly techniques for disc drives. With market emphasis placed on smaller and smaller disc drive assemblies, component fabrication techniques enabling decreased stacking heights of components such as swage mounts are critical. An industry indicia, commonly known as a "form factor," measures the relative stacking heights of such components to predict subsequent overall sizes of such disc drive top assemblies. As a general rule, the lower the form factor, the more desirable the product.

Another problem inherent in the current practice of treating swage mounts involves the inducement of high frequency resonances. Swaging of the swage mount to the load beam causes distortion of the swage mount plate along with an uneven gram loading against the periphery of the swage mount hub. As a result, high frequency resonances during operation of the disc drive are induced, often causing perturbations in the accessing or writing of data to the disc.

What has been needed, and heretofore unavailable, is a process by which miniaturized stainless steel swage mounts can be thermally conditioned into a torque retaining fastener for disc drive load beams with increased plate stiffness to minimize high frequency resonances during operation. The method of the present invention satisfies these needs.

SUMMARY OF THE INVENTION

The method of the present invention significantly increases the torque retaining and plate stiffness characteristics of stainless steel swage mounts thereby enabling miniaturization of such components without losing functionality.

The present invention is directed to a method for thermally conditioning stainless steel swage mounts to increase the coefficient of friction inherent in the metal and to improve material stiffness. Such properties are enhanced such that hub heights can be reduced significantly and still provide adequate fastening capability. Current methods of treating stainless steel swage mounts generally utilize an annealing process which heats the material into a "red area" then cools the material linearly, with respect to time, using a furnace cool. Such methods do not produce enhanced frictional and stiffness properties adequate to cooperate with reduced hub heights because such reduction of the hub results in a correspondingly reduced contact area with which to grip the load beam. Hub reduction, with respect to the load beam, critically compromises the efficiency of the bond therebetween and often translates into a failure of stroh bond thereby rendering the disc drive inoperative. Additionally, deformities resulting from the swage process often cause high frequency resonances during operation of the disc drive because of inadequate material stiffness.

The method of the present invention solves these problems by annealing swage mounts utilizing an oxygen depleted environment and thermally conditioning the components by controlled heating and cooling. Such swage mounts are first exposed to an initial constant temperature between 900° fahrenheit and 1740° fahrenheit within the environment and subsequently cooled controllably using a thermal control mechanism. Such cooling is carried out until a predetermined lower temperature threshold is reached, at which time the swage mount is quickly quenched in a cryogenic medium. Following quench, the component is returned to an ambient environment. The resulting grain structure of the material significantly enhances the coefficient of friction of the component thus enabling hub heights to be dramatically decreased while still retaining adequate fastening functionality.

The method of the present invention also significantly increases the stiffness of the swage mount plate. As a result, the distortion resulting from swaging the swage mount to a load beam is reduced. Such reduction improves the uniformity of the gram loading and the harmonic response, particularly the first torsional and sway modes.

Other features and advantages of the present invention will become apparent from the following detailed description thereof and the accompanying exemplary drawings.

DETAILED DESCRIPTION OF A PREFERRED EMBODIMENT

Figure 1:
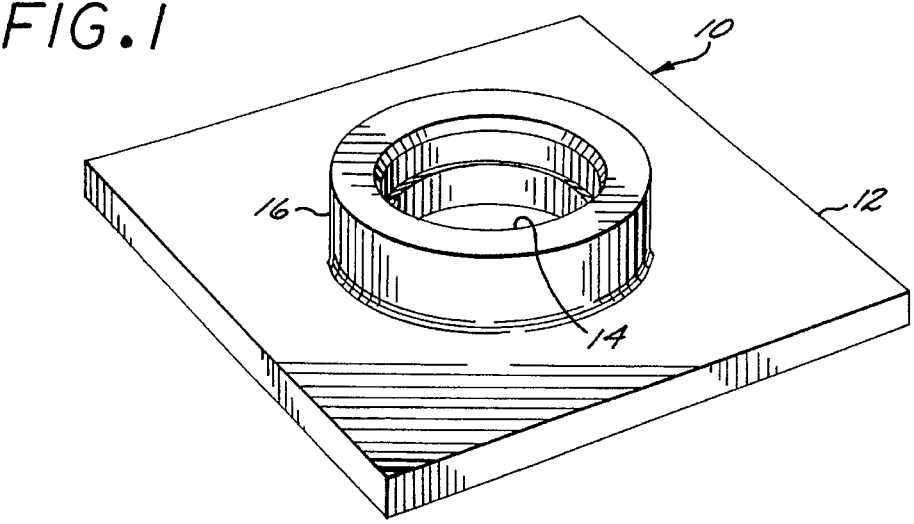
FIG. 1 is a perspective view showing a swage mount to be thermally conditioned by a preferred method embodying the present invention.

A preferred embodiment of the method of the present invention shown in FIGS. 1–3 and 5 is designed to enhance the frictional fastening capability of stainless steel swage mounts for securing disc drive load beams. Such swage mounts generally have rectangular bases with centrally formed openings and circular hubs protruding upwardly therefrom. The hubs of such swage mounts are received within complementally formed openings having recessed walls defining apertures in respective load beams and fastened by forcefully expanding the hub radially outward into the surrounding load beam aperture walls. In order that the load beam retain its alignment with respect to the actuator arm, it is essential that the swage mount material have frictional properties enabling the hub to provide an adequate fastening function. With proposed hub heights having diminishing dimensions in response to lower "form factor" requirements, the frictional characteristics of the material must be increased proportionally to any offsetting decrease in hub height to maintain an adequate frictional bond, alternately expressed as torque retention.

As indicated in the drawings, a stainless steel swage mount, generally designated 10, thermally conditioned in accordance with a preferred method embodying the invention, includes a rectangularly formed base 12 and a central opening 14. Surrounding the opening and protruding upwardly therefrom is a circular border defining a hub 16. In practice, the height of such hubs may approximate ten to seventeen mils.

Figure 4:
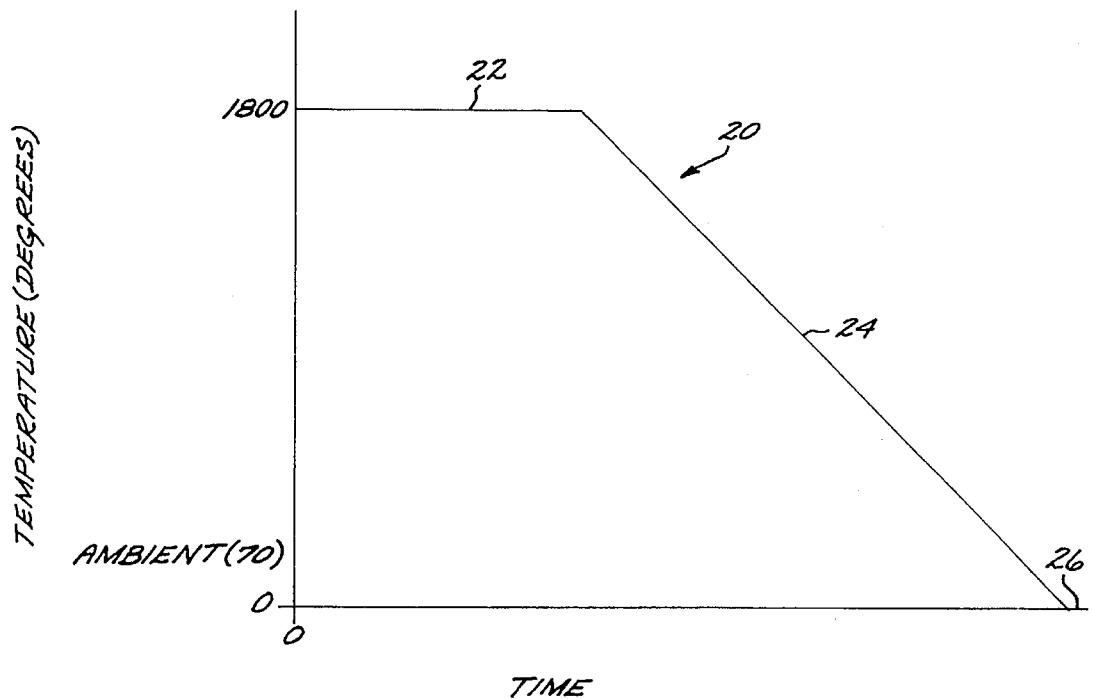
FIG. 4 is a graphical representation of temperature versus time defining the timing and thermal cycling of the prior art process.

As graphically illustrated in FIG. 4, the prior art method of treating such swage mounts to increase torque retention, generally designated 20, includes heating the swage mount to approximately 1800 degrees F. for a timed duration 22, then cooling the component linearly, with respect to time, as indicated by line 24, until ambient conditions are reached at 26. The temperature exposure at 1800 degrees F. brings the material into a "red area" of temperatures characterized by the swage mount material exhibiting a fiery reddish glow. The cooling operation often merely involves shutting the oven off, resulting in a substantially linear reduction in temperature versus time.

Figure 2:
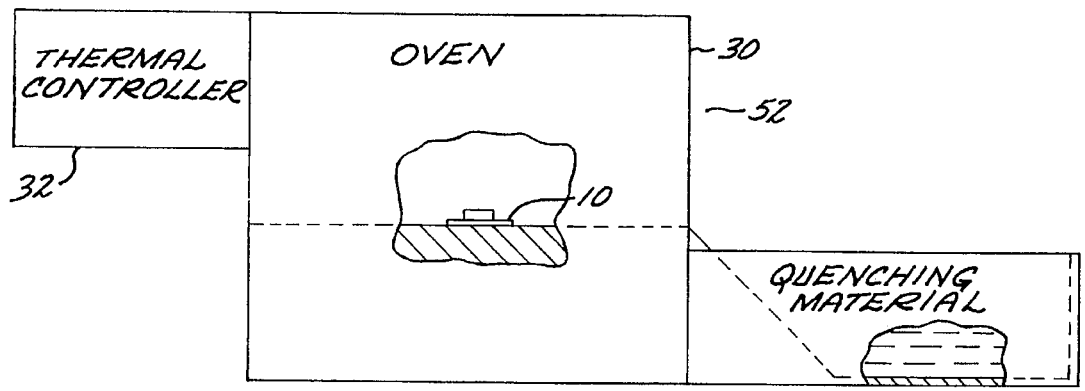
FIG. 2 is a schematic view showing the swage mount of FIG. 1 placed within an oven in accordance with the present invention.
Figure 3:
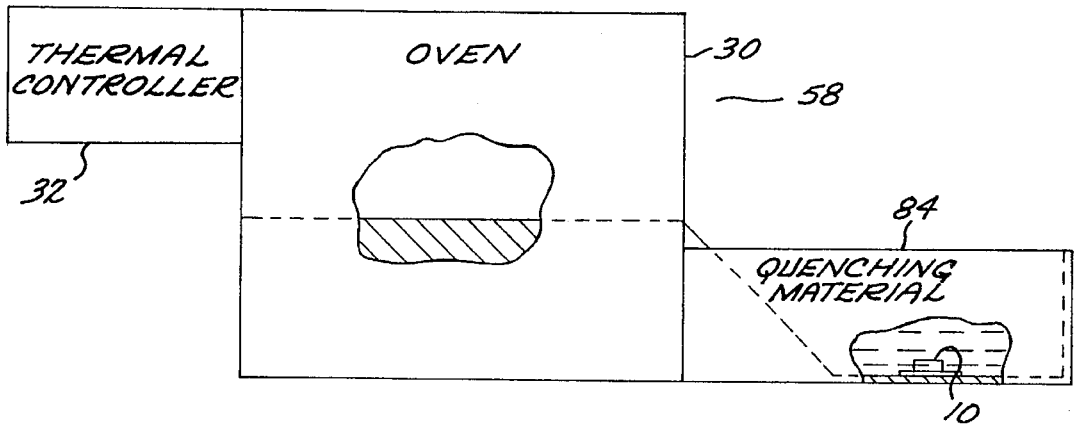
FIG. 3 is a view similar to FIG. 2 showing the swage mount of FIG. 1 immersed in a quenching material following the oven placement of FIG. 2.
Figure 5:
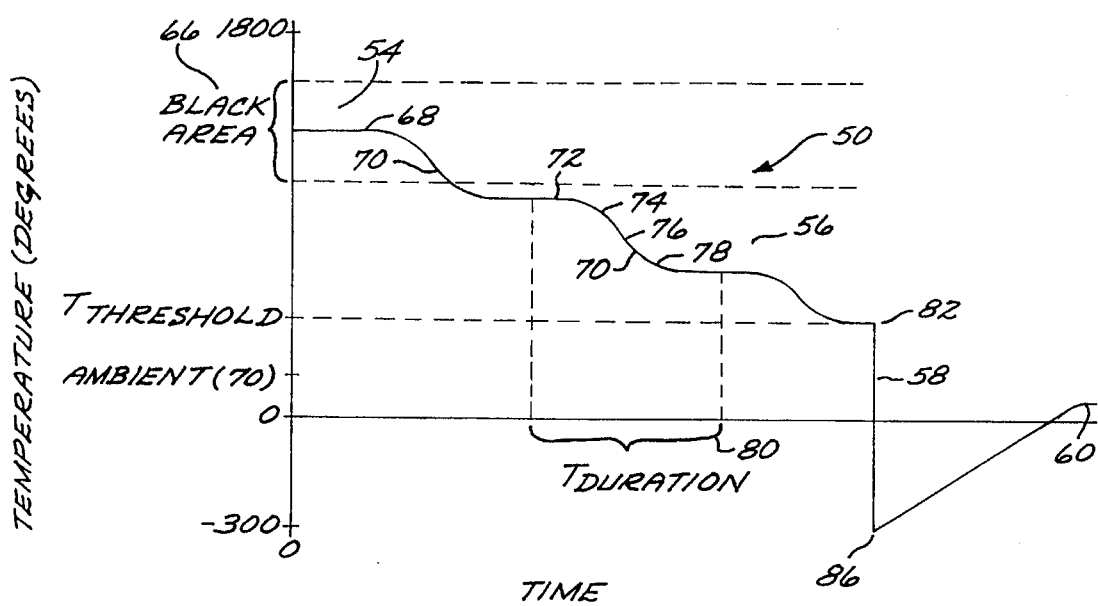
FIG. 5 is a graphical representation of temperature versus time utilizing the method of the present invention as shown in FIGS. 2 and 3.

Referring to FIGS. 2, 3, and correspondingly graphically illustrated in FIG. 5, the method of the present invention, generally designated 30, as differentiated from the prior art process 20, (FIG. 4), thermally conditions such swage mounts 10 utilizing an oven 30, (FIG. 2), within which the swage mount is positioned and incorporating in the oven a thermal controller 32 whereby such swage mount will be heated to an elevated temperature at step 54 sufficient to bring the component within a "black area" temperature band 66 as defined hereinafter, which is substantially lower than the prior art "red area" temperature level approximated by 1800 degrees F. The swage mount is then cooled controllably and non-linearly at step 56 to a lower threshold temperature shown at 82 by the thermal controller, rather than linearly decreasing the temperature 24 to ambient 26 and thereby completing the treatment as performed by the prior art method 20. To further differentiate the present invention from the prior art, once the lower threshold temperature at 82 is reached, the material is quenched at step 58, as indicated in FIG. 3, then allowed to warm to ambient conditions at step 60 thus completing the thermal conditioning method 50 of the present invention.

More particularly, and referring to FIGS. 2 and 5, the first step 52 in the thermal conditioning method of the present invention represented by graph 50 is to position the swage mount 10 within the thermally controlled high temperature oven 30. Once closed, oxygen in the oven is depleted either by evacuating the oven interior to a subatmospheric pressure sufficient to cause a vacuum, or by filling the oven interior with hydrogen gas, virtually eliminating any oxygen therein. Preservation of an oxygen-free environment is important to insure a swage mount free from oxidation and contamination.

As illustrated graphically in FIG. 5, once sealed and depleted of oxygen, the oven interior is heated to initial constant temperature shown at 68 at step 54 falling within a predetermined range of temperatures known in the art as the "black area" 66, as differentiated from the "red area" temperatures commonly used by prior art methods. Such "black area" temperatures are characterized by the heated material exhibiting a black, carbonized appearance. For stainless steel, the black area is bounded approximately by 900 degrees F. and 1750 degrees F., with the actual temperature being dependent upon the mass of the hub 16. For a hub having a height of seventeen mils, the corresponding initial constant temperature would be approximately 1550 degrees F. The swage mount 10 is exposed to the initial constant temperature 68 for a timed duration corresponding to approximately four minutes.

As shown graphically in FIG. 5, following exposure to the constant temperature, the swage mount is controllably cooled non-linearly, ill step 56, by the conventional thermal controller 32, pre-programmed to vary the cooling rate along a series of ramped cooling cycles 70. Each cooling cycle begins and ends at respective start and final temperatures, with subsequent cycles beginning at the finishing temperature of the previous cycle. Following substantially a respective downwardly progressing step-like function, with respect to time, and bounded by the starting and finishing temperatures, each cycle 70 begins with an incremental and gradual temperature reduction 74 followed by a downwardly decreasing temperature lowering 76 and culminates in a gradual tapering of the temperature level 78 to a subsequent constant temperature shown at 72, which corresponds to a temperature differential of approximately fifty degrees F. The cycles are of a duration designated 80 which are substantially equivalent and measure approximately thirty seconds each. Such cycles continue until a predetermined lower threshold temperature 82 is reached, which is also dependent upon the swage mount hub 16 mass. For a hub having a height of ten mils, such threshold temperature would correspond to about 1000 degrees F. for approximately 550 degrees F. less than the initial constant temperature. The thermal cycling is easily accomplished through the use of a programmable feedback controller mechanism using thermocouples or the like to detect temperature variances in the oven and correct accordingly.

Referring to FIGS. 3 and 5, once the threshold temperature 82 is traversed, the swage mount 10 is immediately immersed in a quenching medium 84 capable of instantaneously cooling the swage mount to a cryogenic temperature at 86, as shown in step 58 as graphically illustrated in FIG. 5. In a preferred embodiment, cryogenic argon is used as the quenching medium to set such temperature 86 to the order of −300 degrees F. Such quenching serves to alter the grain structure of the swage mount material in a manner that dramatically increases the frictional and stiffness properties of the material. Once quenched, the swage mount is returned to an ambient environment, as shown in step 60, where it will exhibit frictional properties substantially higher than before such thermal conditioning.

Important advantages result from quenching the swage mount 10 following the series of thermal cycles 70 to achieve the desired frictional and stiffness properties in accordance with the method of the present invention 50. Conventional wisdom in this field teaches that high temperature heating in the "red area," followed by quenching produces material properties that are extremely hard and brittle, properties not generally suited for frictional engagement of intricately formed components. However, in practicing the method of the present invention, by establishing the proper intermediate cooling cycles following the proper initial heating, the brittling effect of the subsequent quenching operation is not as pronounced but rather increases the frictional characteristics of the swage mount material to a point permitting further miniaturization thereof.

The treated swage mount can then be welded in a conventional manner to a disc drive "E-beam" and subsequently frictionally fastened by swaging to a disc drive load beam which positions a read/write head proximate a narrow data track annularly formed into the disc.

Utilization of the aforedescribed thermal conditioning method significantly increases the stiffness of the treated swage mount. As a result of this increase, the distortion normally occurring during swaging of the swage mount to the disc drive load beam is reduced. This reduction serves to improve the uniformity of the gram loading and the harmonic response of the sweeping load beam during operation of the disc drive, especially the first torsional and first sway modes.

From the foregoing description it will be apparent that the method of the present invention provides for an improved method of thermally conditioning disc drive swage mounts for maximizing torque retention and plate stiffness. Such increases allow for decreasing hub heights so as to subsequently lower disc drive component stacking heights, thereby decreasing the overall "form factor" of the drive. Additionally, the improved torque retention prevents load beams from rotationally detaching from respective E-beams, potentially causing disc drive accessing failures and data transfer losses. Furthermore, harmonic resonances are reduced due to the improved stiffness of the swage mount which reduces deformities during the swaging process.

Current methods of thermally conditioning stainless steel swage mounts cannot produce frictional and stiffness properties capable of retaining a load beam with a minimum of resonance under current disc drive component assembly methods. Use of an oxygen depleted environment heated to an elevated temperature, then controllably cooled non-linearly and quenched, solves these problems and results in a conditioned swage mount capable of frictionally fastening a disc drive load beam and having improved harmonics during operation.

While a particular form of the invention has been illustrated and described, it will be apparent to those familiar with the art that various modifications and improvements can be made without departing from the scope of the invention as defined by the following claims.

What is claimed is:

1. A method of thermally conditioning a disc drive torque retaining swage mount for increasing the frictional fastening and plate stiffening properties thereof, said swage mount formed from a metal having an initial coefficient of friction and an initial stiffness, said method including the steps of:

providing an oxygen depleted environment;

heating said environment to an initial constant temperature between 900° F. and 1740° F.;

exposing said swage mount to said environment;

cooling said swage mount by incrementally decreasing said initial constant temperature in a stepped-down fashion from said constant temperature to a reduced threshold temperature, said reduced threshold temperature being approximately 550° F. less than said initial constant temperature;

quenching said swage mount with a cryogenic quenching medium upon traversing said threshold temperature; and restoring said swage mount to ambient temperature whereby said swage mount will exhibit enhanced coefficient of friction and stiffness properties greater than said initial coefficient of friction and said initial stiffness.

2. A method of thermally conditioning a disc drive torque retaining swage mount for increasing the frictional fastening and plate stiffening properties thereof according to claim 1 wherein said step of providing an oxygen depleted environment including evacuating said environment to a subatmospheric pressure sufficient to form a vacuum.

3. A method of thermally conditioning a disc drive torque retaining swage mount for increasing the frictional fastening and plate stiffening properties thereof according to claim 1 wherein said step of providing an oxygen depleted environment includes filling said environment with an inert gas.

4. A method of thermally conditioning a disc drive torque retaining swage mount for increasing the frictional fastening capabilities thereof according to claim 3 wherein said inert gas is hydrogen.

5. A method of thermally conditioning a disc drive torque retaining swage mount for increasing the frictional fastening and plate stiffening properties thereof according to claim 1 wherein said cooling step includes a plurality of thermal cycles performed sequentially and having, respectively, a start temperature and a final temperature, said final temperature acting as said start temperature for a successive cycle until said threshold temperature is traversed, said thermal cycles including the steps of:

maintaining said start temperature for a first timed duration;

decreasing said start temperature controllably for a second timed duration upon expiration of said first timed duration at a ramp rate defining a non-linear step function;

stabilizing said thermal cycle at said final temperature upon expiration of said second timed duration.

6. A method of thermally conditioning a disc drive torque retaining swage mount for increasing the frictional fastening and plate stiffening properties thereof according to claim 5 wherein said thermal cycles defining said non-linear step function include respective durations of approximately 30 seconds with respective corresponding temperature differentials of approximately 50 degrees F. between said respective start temperature and said respective final temperature.

7. A method of thermally conditioning a disc drive torque retaining swage mount for increasing the frictional fastening and plate stiffening properties thereof according to claim 1 wherein said cryogenic temperature is no greater than −150 degrees F.

8. A method of thermally conditioning a disc drive torque retaining swage mount for increasing the frictional fastening and plate stiffening thereof according to claim 7 wherein said quenching medium comprises liquid argon.

9. A method of thermally conditioning a disc drive torque retaining swage mount for increasing the frictional fastening stiffness properties thereof and formed from stainless steel, said method including:

providing an oxygen depleted oven heated to an initial constant temperature between 900 degrees F. and 1740 degrees F.;

heating said swage mount to said initial constant temperature;

cooling said swage mount by sequentially performing a plurality of thermal cycles, such cycles having, respectively, a start temperature and a final temperature, said final temperature acting as said start temperature for each successive cycle until a lower threshold temperature is traversed, said lower threshold temperature being approximately 550° F. less than said initial constant temperature, said thermal cycles including the steps of maintaining said start temperature for a first timed duration; decreasing said start temperature controllably for a second timed duration upon expiration of said first timed duration at a ramp rate defining a non-linear step function; stabilizing said thermal cycle at said final temperature upon expiration of said second timed duration;

quenching said swage mount to cryogenic conditions instantaneously with a cryogenic medium upon traversing said threshold temperature; and restoring said swage mount to ambient conditions following said quenching.

* * * * *